(12) United States Patent
Miyoshi et al.

(10) Patent No.: US 10,370,224 B2
(45) Date of Patent: Aug. 6, 2019

(54) METHOD FOR CONTROLLING STORAGE/RETRIEVAL DEVICE IN FLAT STORAGE FACILITY

(71) Applicant: Daifuku Co., Ltd., Osaka (JP)

(72) Inventors: Kazuhiko Miyoshi, Shiga (JP); Jun Hamaguchi, Shiga (JP); Masato Inaba, Shiga (JP)

(73) Assignee: Daifuku Co., Ltd. (JP)

(*) Notice: Subject to any disclaimer, the term of this patent is extended or adjusted under 35 U.S.C. 154(b) by 13 days.

(21) Appl. No.: 15/809,454

(22) Filed: Nov. 10, 2017

(65) Prior Publication Data

US 2018/0086608 A1 Mar. 29, 2018

Related U.S. Application Data

(63) Continuation of application No. PCT/JP2016/057113, filed on Mar. 8, 2016.

(30) Foreign Application Priority Data

May 22, 2015 (JP) ................................ 2015-104210

(51) Int. Cl.
*B07C 3/10* (2006.01)
*B66C 13/23* (2006.01)
(Continued)

(52) U.S. Cl.
CPC .............. *B66C 13/23* (2013.01); *B65G 1/04* (2013.01); *B65G 1/0421* (2013.01);
(Continued)

(58) Field of Classification Search
CPC .................................. A01F 25/18; B07C 3/10
(Continued)

(56) References Cited

U.S. PATENT DOCUMENTS

| | | | |
|---|---|---|---|
| 2010/0326637 A1* | 12/2010 | Sasaki | ............... H01L 21/67109 |
| | | | 165/138 |
| 2014/0158908 A1* | 6/2014 | Corcoran | ............. G01V 5/0008 |
| | | | 250/453.11 |

FOREIGN PATENT DOCUMENTS

| | | |
|---|---|---|
| JP | S60207784 A | 10/1985 |
| JP | 2005170554 A | 6/2005 |

(Continued)

*Primary Examiner* — Saul Rodriguez
*Assistant Examiner* — Willie Berry, Jr.
(74) *Attorney, Agent, or Firm* — St. Onge Steward Johnston & Reens LLC

(57) ABSTRACT

A flat storage facility includes a storage/retrieval device having a Y-direction moving member with a length corresponding to the width of a storage item placement plane in an X direction and that is movable in a forward/backward Y direction of the storage item placement plane. A carriage is supported on the Y-direction moving member and is movable in the X direction. A storage item gripping mechanism is supported on the carriage so as to be freely raised and lowered. Lowering of the storage item gripping mechanism is controlled such that downward flexural deformation distances between end portions of the Y-direction moving member in the X direction are determined. Lowering distance adjustment values of the storage item gripping mechanism for the storage item placement points are set based on the downward flexural deformation distances, and lowering distances of the storage item gripping mechanism are reduced by the lowering distance adjustment values.

4 Claims, 4 Drawing Sheets

(51) Int. Cl.
*B66C 13/22* (2006.01)
*B65G 63/00* (2006.01)
*B65G 1/04* (2006.01)

(52) U.S. Cl.
CPC ........... *B65G 1/0464* (2013.01); *B65G 63/00* (2013.01); *B65G 63/002* (2013.01); *B66C 13/22* (2013.01); *B65G 2201/02* (2013.01)

(58) Field of Classification Search
USPC ..................................... 414/270, 274, 749.3
See application file for complete search history.

(56) References Cited

FOREIGN PATENT DOCUMENTS

| | | |
|---|---|---|
| JP | 2008262276 A | 10/2008 |
| WO | 2014142107 A1 | 9/2014 |

* cited by examiner

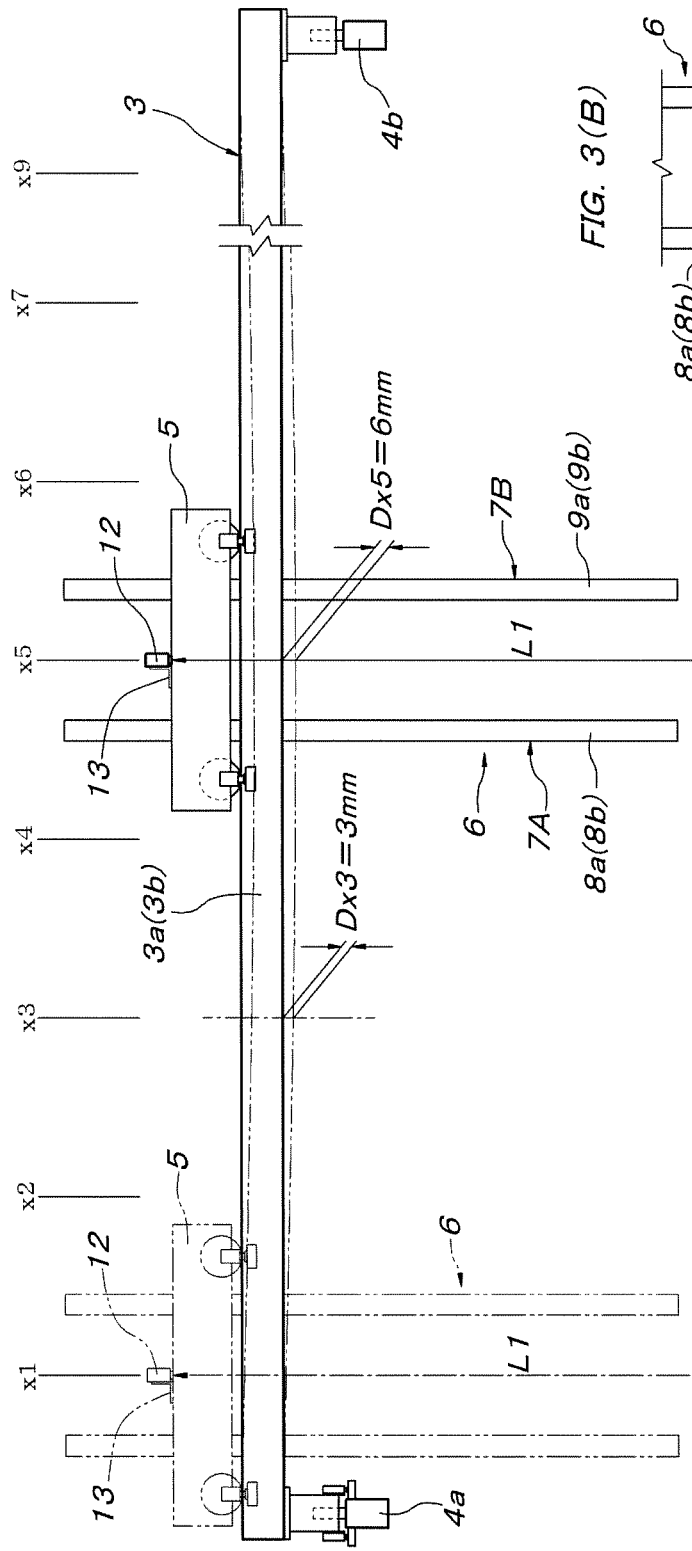
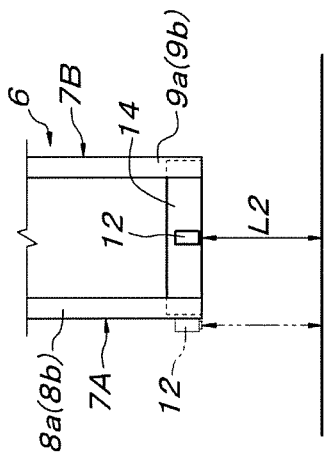
FIG. 3(A)
FIG. 3(B)

METHOD FOR CONTROLLING STORAGE/RETRIEVAL DEVICE IN FLAT STORAGE FACILITY

TECHNICAL FIELD

The present invention relates to a method for controlling a storage/retrieval device in a flat storage facility in which a storage item is directly placed by the storage/retrieval device on a storage item placement plane.

BACKGROUND ART

As this type of flat storage facility, for example, as disclosed in Japanese Published Unexamined Patent Application No. 2008-262276 (Patent Literature 1), a flat storage facility has been known which includes a storage item placement plane and a storage/retrieval device, in which the storage/retrieval device includes a Y-direction laterally moving member that is freely moved horizontally and laterally in a Y direction at a certain height above the storage item placement plane, a carriage that is freely moved horizontally in an X direction perpendicularly intersecting the Y direction above the Y-direction laterally moving member, and a storage item gripping means that is provided in the carriage so as to be freely raised and lowered, and in which the storage/retrieval device is configured so as to perform storage/retrieval on a storage item between respective storage item placement points set on the storage item placement plane.

SUMMARY OF INVENTION

In the flat storage facility configured as described above, in a case where it is attempted to increase the surface area of the storage item placement plane so as to realize a large-scale storage facility whose storage amount is large, it is necessary to increase the length of the Y-direction laterally moving member in the X direction (the movement distance of the carriage in the X direction). In this case, since the Y-direction laterally moving member has a doubly supported beam structure in which only both end portions in the X direction are supported by a pair of Y-direction guide rails, in view of the expected maximum weight of a storage item to be handled, the Y-direction laterally moving member needs to have sufficient rigidity such that a downward flexural deformation distance in a center portion of the length in the X direction falls within an allowable range. Consequently, a large and heavy Y-direction laterally moving member is needed, and thus a significant increase in the facility cost is inevitable.

The present invention proposes a method for controlling a storage/retrieval device in a flat storage facility which can solve the conventional problem as described above, and for ease of understanding of a relationship with an embodiment which will be described later, the feature of the controlling method according to the present invention will be shown with reference signs which are used in the description of the embodiment and which are placed in parentheses. In a method for controlling a storage/retrieval device in a flat storage facility which includes a rectangular storage item placement plane (1) and a storage/retrieval device (2), and in which the storage/retrieval device (2) includes a Y-direction laterally moving member (3) that has a length corresponding to the width of the storage item placement plane (1) in a lateral X direction and that is freely moved laterally in a forward/backward Y direction of the storage item placement plane (1), a carriage (5) that is supported on the Y-direction laterally moving member (3) so as to be freely moved in the lateral X direction, and a storage item gripping means (6) that is supported on the carriage (5) so as to be freely raised and lowered, and the storage/retrieval device (2) is configured so as to be able to store and retrieve a storage item (C) gripped by the storage item gripping means (6) with respect to respective storage item placement points (Cp) set on the storage item placement plane (1) by the movement of the Y-direction laterally moving member (3) in the forward/backward Y direction, the movement of the carriage (5) in the lateral X direction, and the raising/lowering movement of the storage item gripping means (6), it is the feature of the control method that control is performed such that downward flexural deformation distances (Dx3, Dx5) between both end portions of the Y-direction laterally moving member (3) in the lateral X direction are determined, lowering distance adjustment values of the storage item gripping means (6) for the respective storage item placement points (Cp) are set based on the downward flexural deformation distances (Dx3, Dx5), and lowering distances of the storage item gripping means (6) are reduced by the lowering distance adjustment values.

According to the controlling method of the present invention, even with a Y-direction laterally moving member whose flexural strength is insufficient and in which the downward flexural deformation distance of the Y-direction laterally moving member exceeds an allowable range, a gripping and lifting action for a storage item and a lowering action for the storage item with a storage item gripping means can be safely and reliably performed without any problem.

That is, in a case where the downward flexural deformation occurs in the Y-direction laterally moving member, the height of a carriage including the storage item gripping means on the Y-direction laterally moving member from the storage item placement plane is lowered by the downward flexural deformation distance of the Y-direction laterally moving member at the position of the carriage. In other words, even when the storage item gripping means is precisely lowered from the carriage by a set distance, the height of the storage item gripping means viewed from the storage item placement plane when the lowering of the storage item gripping means is completed is lowered by the downward flexural deformation distance of the Y-direction laterally moving member at the position of the carriage. Therefore, when the storage item on the storage item placement plane is gripped and lifted, in a case where the storage item gripping means is required to be lowered to the minimum lowering limit height so as to be closest to the storage item placement plane since the height of the storage item is lowest, there is a possibility that the lower end of the storage item gripping means may collide against the storage item placement plane. By contrast, in a case where the storage item is lowered onto the storage item placement plane or in a case where the storage item is stacked on a storage item placed on the storage item placement plane, the lowered storage item is pressed excessively onto the storage item placement plane or the storage item on the lower side, with the result that between a gripped portion of the storage item and a gripping action portion of the storage item gripping means engaged with each other in a horizontal direction, a pressing force exceeding an allowable range is produced so as to cause damage, and, depending on the case, when the gripping action portion of the storage item gripping means is released laterally from the gripped portion of the storage item, the storage item is drawn together in the lateral direction, and the storage item may be displaced from a proper lowering position.

However, according to the controlling method of the present invention described above, even when the height of the carriage for supporting the storage item gripping means so as to freely raise and lower the storage item gripping means is lowered by the downward flexural deformation distance of the Y-direction laterally moving member supporting the carriage, the lowering distance of the storage item gripping means when the storage item gripping means is lowered for the gripping and lifting action for the storage item or the lowering action for the storage item can be reduced by the lowered height or a height close thereto, and thus a state can be realized where the lowering position of the storage item gripping means viewed from the storage item placement plane is equal to or close to the proper height when the flexural deformation does not occur on the Y-direction laterally moving member. Consequently, it is possible to satisfactorily and reliably perform the gripping and lifting action for the storage item or the lowering action for the storage item while preventing the problem as described above from occurring.

It is noted that, as the means for detecting the downward flexural deformation distance of the Y-direction laterally moving member, various types of means can be considered. For example, it is possible that a distance measuring means for measuring a vertical distance up to the storage item placement plane is attached to the carriage which is moved in the X direction with respect to the Y-direction laterally moving member, the carriage is moved to a measurement position between both the end portions of the Y-direction laterally moving member, the vertical distance up to the storage item placement plane is measured with the distance measuring means, and the lowering distance adjustment value is set based on the measured value. It is also possible that the distance measuring means for measuring the vertical distance up to the storage item placement plane is supported on a lower end portion of the storage item gripping means which is freely raised and lowered with respect to the carriage, the carriage is moved to the measurement position between both the end portions of the Y-direction laterally moving member, in a state where the storage item gripping means is lowered a given distance from the carriage, the vertical distance up to the storage item placement plane is measured with the distance measuring means, and the lowering distance adjustment value is set based on the measured value.

As compared with the former configuration in which the distance measuring means is attached to the carriage, in the latter configuration in which the distance measuring means is supported on the lower end portion of the storage item gripping means, it is possible to significantly shorten the vertical distance up to the storage item placement plane of the distance measuring means, it is therefore possible to easily decrease a measurement error in the vertical distance up to the storage item placement plane including a measurement error caused by the inclination of the measurement axis of the distance measuring means, with the result that it is possible to enhance the accuracy of the adjustment of the lowering distance of the storage item gripping means.

Furthermore, in a case where the latter configuration in which the distance measuring means is supported on the lower end portion of the storage item gripping means is implemented, rather than directly attaching the distance measuring means to the lower end portion of the storage item gripping means, it is possible to attach the distance measuring means to a support member gripped by the lower end portion of the storage item gripping means so as to match the center position of a flat surface of the storage item gripped by the storage item gripping means or to be located in the vicinity thereof. According to this configuration, in a case where the storage item is placed such that the center position of the flat surface of the storage item matches each of storage item placement points set on the storage item placement plane, it is possible to adjust the lowering distance of the storage item gripping means based on the downward flexural deformation distance of the Y-direction laterally moving member so as to precisely correspond to the storage item placement point set on the storage item placement plane, with the result that the gripping and lifting action for the storage item and the lowering action for the storage item can be performed more safely and reliably.

BRIEF DESCRIPTION OF DRAWINGS

FIG. 3A is a side view illustrating the attachment position of a distance measuring means to the storage/retrieval device and situations in which the downward flexural deformation distance of a laterally moving member is measured with the distance measuring means, and FIG. 3B is a side view of a main portion in a case where the attachment position of the distance measuring means is changed.

DESCRIPTION OF EMBODIMENTS

Figure 1:
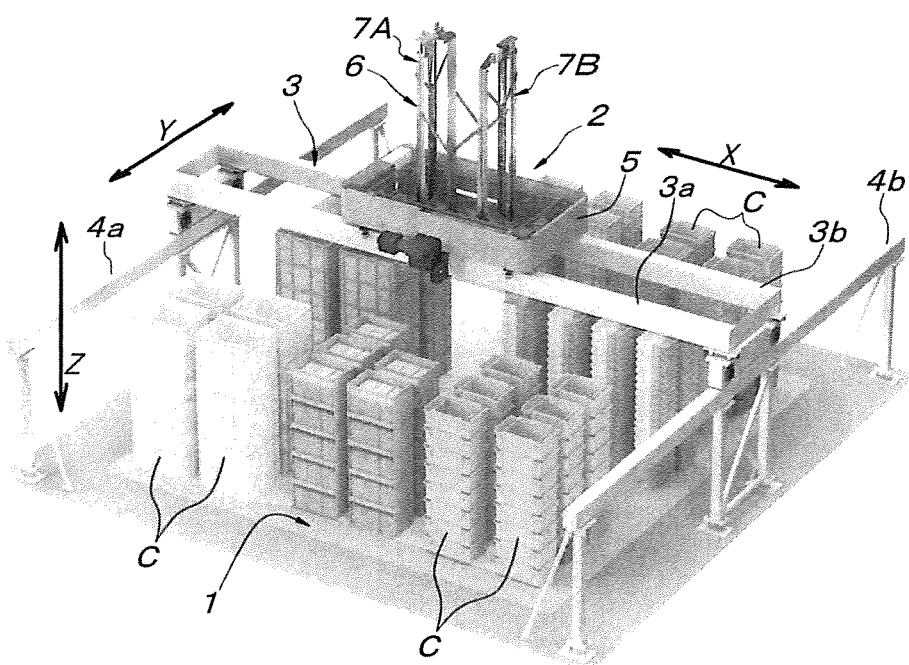
FIG. 1 is a perspective view showing an example of the configuration of an entire storage facility.

In FIG. 1, reference sign 1 denotes a rectangular storage item placement plane, and reference sign 2 denotes a storage/retrieval device. Reference sign 3 denotes a Y-direction laterally moving member, and the Y-direction laterally moving member 3 includes two guide rails 3a and 3b parallel to an X direction (left/right direction). Reference sign 4a and 4b denote a pair of fixed guide rails which are placed parallel to the Y direction on both outsides of the storage item placement plane 1 in the X direction, and the pair of fixed guide rails 4a and 4b support both end portions of the Y-direction laterally moving member 3 in the X direction such that the Y-direction laterally moving member 3 is freely moved parallel to the Y direction (forward/backward direction) above a certain height of the storage item placement plane 1. The storage/retrieval device 2 is configured with a carriage 5 which is supported by the two guide rails 3a and 3b on the Y-direction laterally moving member 3 so as to be freely moved in the X direction and a storage item gripping means 6 which is supported by the carriage 5 so as to be freely raised and lowered.

Although as the storage item gripping means 6, various types thereof which are configured so as to be compatible with the storage items to be handled can be considered, the storage item gripping means 6 in this embodiment includes an X-direction pair of gripping units 7A and 7B such that the gripping units 7A and 7B are freely moved close to and away from each other in the X direction. Both the gripping units 7A and 7B are supported to the carriage 5 so as to be raised and lowered between the two guide rails 3a and 3b of the Y-direction laterally moving member 3 and to be capable of raising and lowering in synchronization with each other, and include Y-direction pairs of gripping columnar members 8a to 9b and lifting tools 10 and 11 located in a center position between the gripping columnar members 8a and 8b and in a center position between the gripping columnar members 9a and 9b. A storage item C that is handled in this embodiment is a rectangular plastic transport container which has, in a planar shape, a width W in the Y direction and a length L in the X direction, and includes, on its outside surface, a reinforcement overhanging rib Cx which is continuous over the entire periphery.

The respective gripping columnar members 8a to 9b are columnar members which can be fitted from the outside to the four corners of the storage item C and whose horizontal cross section is formed in the shape of the letter L, and in the lifting tools 10 and 11, engagement tools 10a and 11a which are freely engaged and disengaged with the reinforcement overhanging rib Ca in the center portions of both sides of the storage item C parallel to the Y direction are provided on at least the inner sides of the lower end portions of raising/lowering columnar members 10b and 11b. The engagement tools 10a and 11a include a large number of pins which protrude from vertical rectangular surfaces parallel to the Y direction and which are parallel to the X direction, and the respective pins are held in a protruding posture where the pins are protruded inward by springs.

Figure 2A:
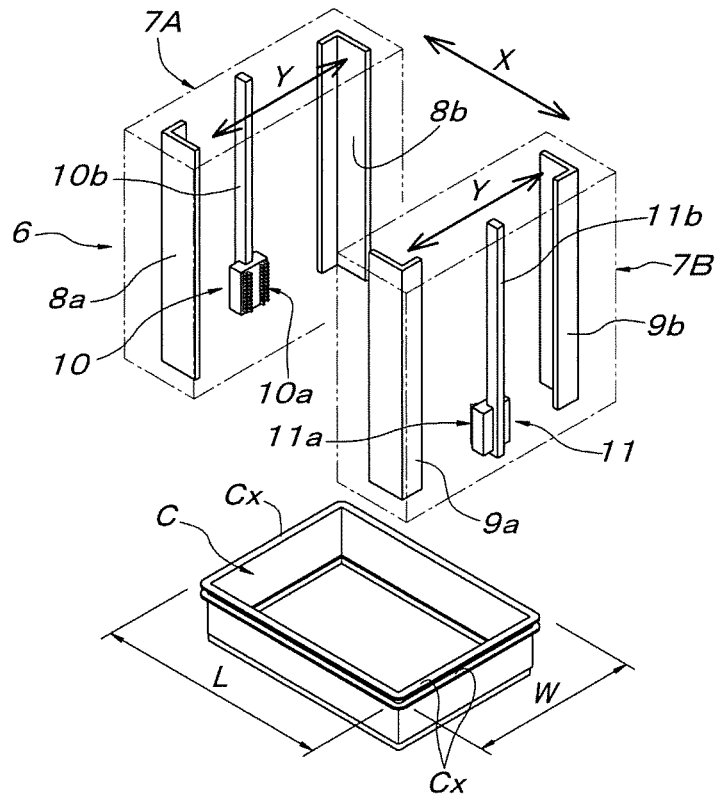
FIG. 2A is a perspective view showing the storage item gripping means of a storage/retrieval device and a storage item in the storage facility.
Figure 2B:
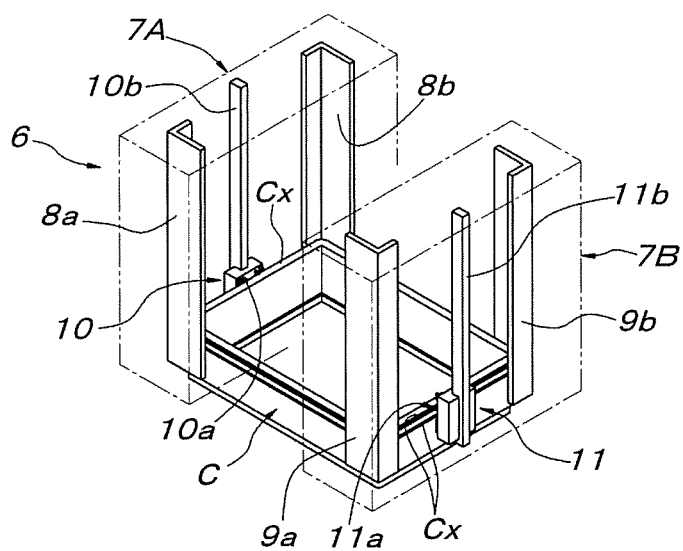
FIG. 2B is a perspective view showing a state where the storage item gripping means grips the storage item.

According to the storage facility configured as described above, by the lateral movement of the Y-direction laterally moving member 3 in the Y direction and movement of the carriage 5 on the Y-direction laterally moving member 3 in the X direction, the storage item gripping means 6 can be moved to a certain height above a desired position (including a transport terminal end portion of a storage conveyor and a transport beginning end portion of a retrieval conveyor, although not shown in the figure) on the storage item placement plane 1. On the other hand, the storage item gripping means 6 can be switched between a gripping action releasing state and a gripping action state. In the gripping action releasing state of the storage item gripping means 6, the gripping units 7A and 7B are in an X-direction retract limit position in which the gripping units 7A and 7B are separated from each other in the X direction, and the gripping columnar members 8a, 8b, 9a, and 9b are in a Y-direction retract limit position in which the gripping columnar members 8a, 8b, 9a, and 9b are separated from each other in the Y direction with respect to the lifting tools 10 and 11 located at their respective center positions. In the gripping action state of the storage item gripping means 6, the gripping units 7A and 7B are moved up to a distance corresponding to the X-direction length L of the storage item C so as to approach each other in the X direction, and simultaneously, the respective gripping columnar members 8a, 8b, 9a, and 9b are moved up to a distance corresponding to the Y-direction width W of the storage item C so as to approach each other in the Y direction with respect to the lifting tools 10 and 11 located at their respective center positions, and as shown in FIG. 2B, the four gripping columnar members 8a to 9b are fitted from the outside to the four corners of the storage item C so as to position the storage item C, and simultaneously, the respective engagement tools 10a and 11a of the pair of the lifting tools 10 and 11 are engaged with the reinforcement overhanging rib Ca on the outside surface of the storage item C parallel to the Y direction. In a state where the engagement tools 10a and 11a are engaged with the reinforcement overhanging rib Ca in the storage item C, at least two pins at the same height in the protruding posture in the respective engagement tools 10a and 11a enter the lower side of the reinforcement overhanging rib Ca in the storage item C, and pins which collide against the reinforcement overhanging rib Ca are brought into a state where they are retracted against a biasing force.

When the storage item C is transported by the storage item gripping means 6, the storage item gripping means 6 is moved to a position directly above the storage item C to be retrieved by the lateral movement of the Y-direction laterally moving member 3 in the Y direction and the movement of the carriage 5 on the Y-direction laterally moving member 3 in the X direction. Then, the gripping units 7A and 7B of the storage item gripping means 6 in the gripping action releasing state are lowered to the height of the storage item C to be retrieved with respect to the carriage 5, and thereafter the storage item gripping means 6 is switched to the gripping action state. Consequently, as shown in FIG. 2B, the four gripping columnar members 8a to 9b are fitted from the outside to the four corners of the storage item C so as to position the storage item C, and simultaneously, the respective engagement tools 10a and 11a of the pair of the lifting tools 10 and 11 are engaged with the reinforcement overhanging rib Ca in the storage item C, then the storage item gripping means 6 in the gripping action state is raised to a raising limit height with respect to the carriage 5 or to such a height that the horizontal transport of the storage item C is not obstructed.

The storage item C to be retrieved is lifted to a predetermined height as described above, then the storage item C gripped by the storage item gripping means 6 is horizontally transported to a target lowering position by the lateral movement of the Y-direction laterally moving member 3 in the Y direction and the movement of the carriage 5 on the Y-direction laterally moving member 3 in the X direction. The lateral movement of the Y-direction laterally moving member 3 and the movement of the carriage 5 may be performed simultaneously with the process for lifting the storage item C to be retrieved to the predetermined height. Thereafter, the storage item gripping means 6 gripping the storage item C is lowered to a predetermined height with respect to the carriage 5, the storage item C gripped by the storage item gripping means 6 is lowered to the target position, and then the storage item gripping means 6 in the gripping action state is switched to the gripping action releasing state so as to release the storage item C from the storage item gripping means 6, and the process for lowering the storage item C to the target position is completed. Thereafter, the storage item gripping means 6 in the gripping action releasing state is raised to a predetermined height with respect to the carriage 5, and thus a series of storage item lifting transport steps are completed.

It is noted that, when the storage items C can be stacked, a plurality of storage items C in a stacked state can be collectively lifted and transported by the gripping action of the storage item gripping means 6 on the lowermost storage item C. Although at this time, only the lowermost storage item C is lifted by the lifting tools 10 and 11 of the storage item gripping means 6, since the four corners of all of the storage items C in a stacked state including the lowermost storage item C are positioned by the four gripping columnar members 8a to 9b, the stacked state is stably held. It is a matter of course that, in order to handle a large number of stacked storage items, in the lifting tools 10 and 11, the engagement tools 10a and 11a can also be provided vertically in a plurality of stages on the raising/lowering columnar members 10b and 11b. By the operation of the storage item gripping means 6, it is also possible to transport out only a specific storage item C among a plurality of storage items C in a stacked state and to newly stack another storage item C on the storage item C stored on the storage item placement plane 1.

Although the storage facility can be used as described above, the following measuring/setting operation is performed before the storage facility is actually operated. That is, as shown in FIG. 3, at a lower end portion of the carriage 5 or the storage item gripping means 6, a distance measuring means 12 which measures a vertical distance to the storage item placement plane 1 is temporarily attached in order to perform the measuring/setting operation, and the distance measuring means 12 is utilized so as to measure a downward flexural deformation distance between both end portions of the Y-direction laterally moving member 3.

A specific description will be given below. In the storage facility according to this embodiment, as shown in FIG. 4B, on the storage item placement plane 1, storage item placement points Cp on which the storage item C is placed are set at predetermined intervals in the X direction and the Y direction. Each of the storage item placement points Cp is a position in which the storage item C is supported in a state where the storage item placement point Cp matches the center point of the storage item C in plan view, and X-Y coordinate values for identifying positions on the storage item placement plane 1 are provided for all the storage item placement points Cp. In the figure, coordinate values of x1 to x9 for the X direction are set, coordinate values of y1 to y13 for the Y direction are set, and both the coordinate values are combined so as to provide the X-Y coordinate values, such as x3, y2, for all the storage item placement points Cp.

Figure 4A:
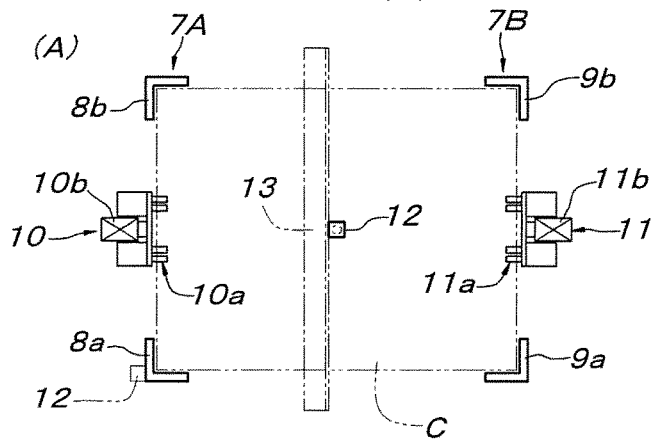
FIG. 4A is a plan view showing the attachment structure of the distance measuring means.
Figure 4B:
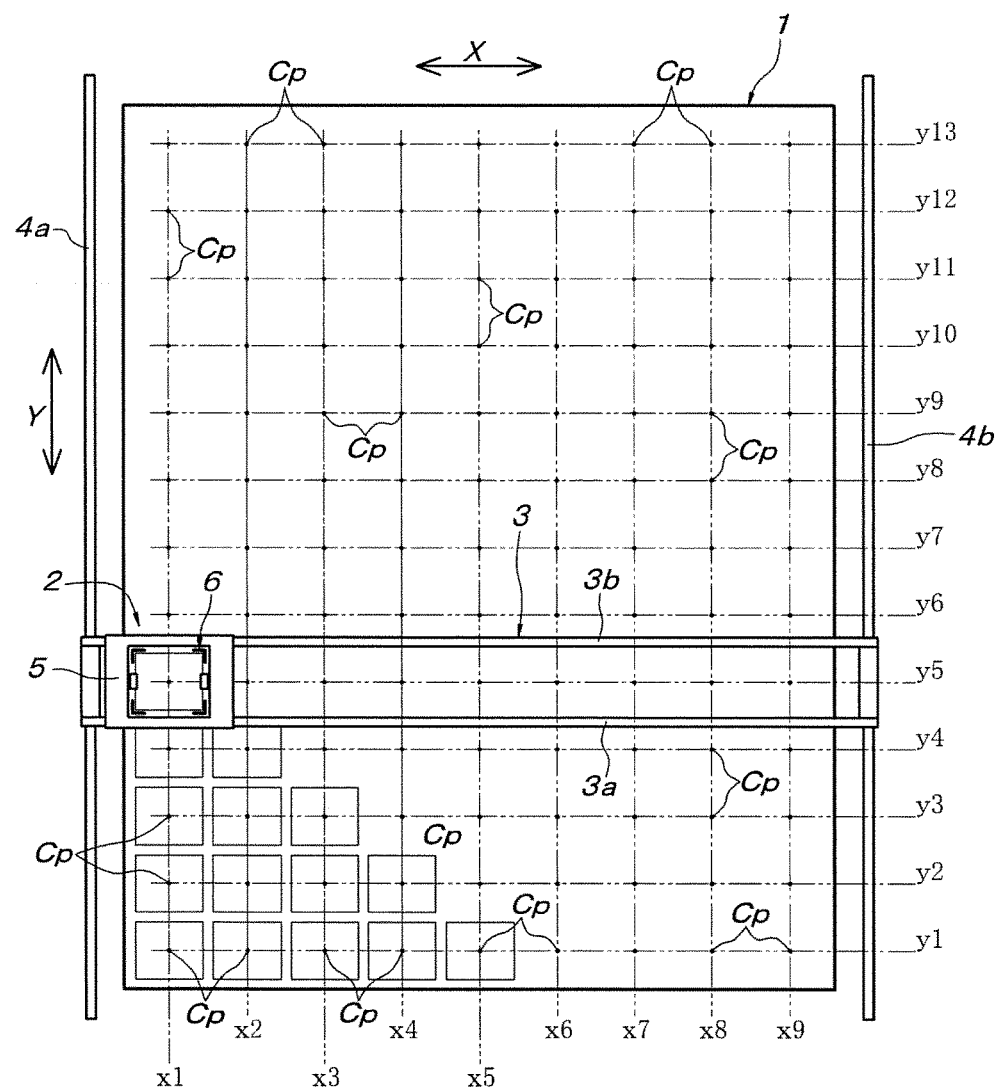
FIG. 4B is a plan view illustrating storage item placement points on a storage item placement plane in the storage facility.

As shown in FIG. 4A, since the center point of the storage item C in plan view which is made to match the individual storage item placement point Cp matches the center position of a quadrangle surrounded by the four gripping columnar members 8a to 9b of the storage item gripping means 6 which are fitted to the four corners of the storage item C for positioning, the distance measuring means 12 is preferably attached so as to match the vertical center line of the quadrangle surrounded by the four gripping columnar members 8a to 9b. Specifically, as shown in FIG. 3A, when the distance measuring means 12 is supported on the carriage 5, an attachable/detachable support member 13 which passes through the center portion of the quadrangle surrounded by the four gripping columnar members 8a to 9b or a position in the vicinity thereof is attached to the carriage 5 only at the time of the measurement, and the distance measuring means 12 is attached to the support member 13 so as to match the vertical center line of the quadrangle surrounded by the four gripping columnar members 8a to 9b. As shown in FIG. 3B, when the distance measuring means 12 is supported on the lower end portion of the storage item gripping means 6, for example, as with the storage item C, a support member 14 (the storage item C may be used instead) whose planar shape is quadrangular and which can be gripped at the lower end portion of the storage item gripping means 6 is prepared, and in a state where the distance measuring means 12 is attached to the center position of the support member 14, the support member 14 may simply be gripped by the lower end portions of the four gripping columnar members 8a to 9b and the lifting tools 10 and 11 only at the time of the measurement as with the storage item C. It is noted that, as the distance measuring means 12, various types of conventionally known ones can be utilized such as a distance sensor utilizing laser light or ultrasonic waves or a mechanical distance measuring device, that is, a mechanical distance measuring device which is formed with a measuring rod-shaped member that is supported on a main body attached to an arbitrary one of the support members 13 and 14 or of the gripping columnar members 8a to 9b so as to be freely and vertically raised and lowered and a detector that is attached to the main body so as to detect the distance of the lowering of the measuring rod-shaped member until the lower end of the measuring rod-shaped member makes contact with the storage item placement plane 1.

When the distance measuring means 12 is attached as described above, the carriage 5 is moved from one end of the movement path of the carriage 5 toward the other end on the Y-direction laterally moving member 3, the carriage 5 is stopped at a previously set measurement position, the vertical distance up to the storage item placement plane 1 directly below is measured with the distance measuring means 12 and the downward flexural deformation distance of the Y-direction laterally moving member 3 is computed from the measured value thereof. When the distance measuring means 12 is supported via the support member 14 at the lower end portion of the storage item gripping means 6, the carriage 5 is stopped at a predetermined measurement position, the storage item gripping means 6 is lowered and the measurement is performed in a state where the distance measuring means 12 is brought close to the storage item placement plane 1. A specific example will be described with reference to FIGS. 3 and 4B. In a state where the carriage 5 is located at one end of the movement path of the carriage 5 on the Y-direction laterally moving member 3 and where the distance measuring means 12 is located directly above the X-direction coordinate value=X1 on the storage item placement plane 1, the vertical distance L1 (or L2) up to the storage item placement plane 1 is measured with the distance measuring means 12, and the measured value is set to a reference value for zero flexural deformation. Then, the carriage 5 is moved, in a state where the distance measuring means 12 is located in the center position between both end portions of the Y-direction laterally moving member 3, that is, a position directly above the X-direction coordinate value=x5 on the storage item placement plane 1, the vertical distance L1 (or L2) up to the storage item placement plane 1 is measured with the distance measuring means 12 and a value obtained by subtracting the measured value from the reference value is acquired as the downward maximum flexural deformation distance Dx5 of the Y-direction laterally moving member 3.

On the assumption that the maximum flexural deformation distance is 6 mm and that in a region of the Y-direction laterally moving member 3 from one end portion corresponding to the X-direction coordinate value=x1 to the center portion corresponding to the X-direction coordinate value=x5, the downward flexural deformation distance of the Y-direction laterally moving member 3 is gradually increased in proportion to the distance from 0 mm to 6 mm, without performing measurements at the positions corresponding to the X-direction coordinate values of x2, x3, and x4 with the distance measuring means 12, a flexural deformation distance Dx2 at the position corresponding to the X-direction coordinate value=x2, a flexural deformation distance Dx3 at the position corresponding to the X-direction coordinate value=x3, and a flexural deformation distance Dx4 at the position corresponding to the X-direction coordinate value=x4 can be acquired by computing so as to be 1.5 mm, 3 mm, and 4.5 mm, respectively. Since in a region of the Y-direction laterally moving member 3 from the center portion corresponding to the X-direction coordinate value=x5 to the end portion corresponding to the X-direction coordinate value=x9 on the opposite side, the flexural deformation of the Y-direction laterally moving member 3 can be considered to appear as a symmetrical shape with the flexural deformation in the region from the one end portion corresponding to the X-direction coordinate value=x1 to the center portion corresponding to the X-direction coordinate value=x5, without performing measurements at the positions corresponding to the X-direction coordinate values of x6, x7, and x8 with the distance measuring means 12, a flexural deformation distance Dx6 at the position corresponding to the X-direction coordinate value=x6, a flexural deformation distance Dx7 at the position corresponding to the X-direction coordinate value=x7, and a flexural deformation distance Dx8 at the position corresponding to the X-direction coordinate value=x8 can be acquired by computing so as to be 4.5 mm, 3 mm, and 1.5 mm, respectively.

Although according to the results of the measurement and computation in the embodiment described above, in both left and right regions from both end portions corresponding to the X-direction coordinate values=x1 and x9 of the Y-direction laterally moving member 3 to the center portion corresponding to the X-direction coordinate value=x5, the Y-direction laterally moving member 3 is flexed linearly and downward toward the center, since in actuality, the Y-direction laterally moving member 3 is flexed downward while being curved gradually as the Y-direction laterally moving member 3 is extended from both end portions of the Y-direction laterally moving member 3 close to the X-direction coordinate value=x5, under situations in which the maximum flexural deformation distance Dx5 in the center portion is increased, a difference between the actual flexural deformation distance and the computed flexural deformation distance as described above within both left and right end regions of the Y-direction laterally moving member 3 from both end portions to the center portion is increased. Therefore, in such a case, even within both left and right regions of the Y-direction laterally moving member 3 from both end portions to the center portion, it is preferable to add the flexural deformation distance determined based on the values measured with the distance measuring means 12. Specifically, even at the intermediate point corresponding to the X-direction coordinate value=x3 shown in FIGS. 3A and 4B, the vertical distance L1 (or L2) up to the storage item placement plane 1 is measured with the distance measuring means 12, and values obtained by subtracting the measured values from the reference value can be acquired as the flexural deformation distances Dx3 and Dx7 at the positions corresponding to the X-direction coordinate values=x3 and x7.

Assuming that the flexural deformation distances Dx3 and Dx7 additionally acquired as described above are 4 mm, the average value of the measured values can be acquired by computing such that the flexural deformation distances Dx2 and Dx8 at the positions corresponding to the X-direction coordinate values=x2 and x8 is 2 mm and that the flexural deformation distances Dx4 and Dx6 at the positions corresponding to the X-direction coordinate values=x4 and x6 is 5 mm. As a matter of course, the downward flexural deformation distances of the Y-direction laterally moving member 3 at the positions corresponding to all the X-direction coordinate values of the X-direction coordinate values=x1 to x5 can also be acquired based on the measured values measured by utilization of the distance measuring means 12.

Furthermore, although it is assumed that, in the Y-direction laterally moving member 3, the flexural deformation in both left and right regions from the center portion to both ends occurs in a symmetrical shape, and thus measurements within the half of the region are omitted, it is also possible to perform measurements using the distance measuring means 12 at the positions corresponding to all the X-direction coordinate values=x1 to x9 within the regions of the entire length of the Y-direction laterally moving member 3 to acquire the measured values as the flexural deformation distances of the Y-direction laterally moving member 3 at the respective positions corresponding to all the X-direction coordinate values=x1 to x9.

When, as described above, the downward flexural deformation distances at a plurality of positions (in this embodiment, the positions corresponding to the X-direction coordinate values=x1 to x9) at appropriate intervals of the Y-direction laterally moving member 3 in the X direction are acquired by the measurement and computation, the flexural deformation distances are set as the lowering distance adjustment values of the storage item gripping means 6 for respective storage item placement points Cp on the storage item placement plane 1, and the lowering driving of the storage item gripping means 6 is controlled such that the lowering distances of the storage item gripping means 6 are reduced by the lowering distance adjustment values.

Specifically, assuming that the flexural deformation distance at the position corresponding to an X-direction coordinate value xn (in FIG. 4B, any one of the X-direction coordinate values x1 to x9) in the Y-direction laterally moving member 3 is x mm, the lowering distance adjustment values for all the storage item placement points Cp (in FIG. 4B, the individual storage item placement points Cp of the Y-direction coordinate values of y1 to y13) in the Y direction on the X-direction coordinate value xn among the storage item placement points Cp on the storage item placement plane 1 are set to −x mm, and when a storage/retrieval operation is performed for all the storage item placement points Cp in the Y direction on the X-direction coordinate value xn, the lowering distance of the storage item gripping means 6 is reduced from a specified distance by x mm. By performing the control adopting the lowering distance adjustment value, the storage item gripping means 6 is lowered by "specified distance-lowering distance adjustment value" on all the storage item placement points Cp in the Y direction on the X-direction coordinate value xn, and the height of the storage item gripping means 6 when viewed from the side of the storage item placement plane 1 is constantly a specified height obtained when the flexural deformation of the Y-direction laterally moving member 3 does not occur, with the result that it is possible to perform the desired storage/retrieval operation with the storage item gripping means 6.

Although in the embodiment described above, the positions in which the downward flexural deformation distances of the Y-direction laterally moving member 3 are acquired in regard to the lateral X direction are set to the positions (the X-direction coordinate values of x1 to x9) corresponding to the respective storage item placement points Cp aligned in the X direction on the storage item placement plane 1, since in actuality, the intervals between the respective storage item placement points Cp on the storage item placement plane 1 in the lateral X direction are significantly smaller than the entire width of the storage item placement plane 1 in the lateral X direction, the entire width of the storage item placement plane 1 in the lateral X direction is divided into a plurality of sections such that each of the sections includes a plurality of storage item placement points Cp aligned in the lateral X direction, measurement positions corresponding to the center positions of the individual sections in the lateral X direction are set on the Y-direction laterally moving member 3, in a state where the carriage 5 is located in each of the measurement positions, the vertical distance up to the storage item placement plane 1 is measured with the distance measuring means 12, a value obtained by subtracting the measured value from the reference value is set as the lowering distance adjustment value for each of the sections and thus it is possible to perform control such that the lowering distance adjustment value for each of the sections is applied by subtraction to the specified lowering distance of the storage item gripping means 6 when the storage/retrieval operation is performed for a plurality of storage item placement points Cp in the lateral X direction located in the individual sections.

Although the attachment position of the distance measuring means 12 is set to the center position of the quadrangle surrounded by the four gripping columnar members 8a to 9b of the storage item gripping means 6, there is no limitation to this configuration. For example, when the downward flexural deformation distance of the Y-direction laterally moving member 3 is small, there is practically almost no problem even when the distance measuring means 12 is attached to the lower end portion of one of the gripping columnar members 8a to 9b, as indicated by imaginary lines in FIGS. 3B and 4A.

A method for controlling a storage/retrieval device in a flat storage facility according to the present invention can be utilized as a method for controlling a flat storage facility which uses a storage/retrieval device including a Y-direction laterally moving member, a carriage that is moved in an X direction on the Y-direction laterally moving member, and a storage item gripping means that is supported by the carriage so as to be freely raised and lowered, in particular, a storage/retrieval device in a large flat storage facility in which the length of the Y-direction laterally moving member is increased.

The invention claimed is:

1. A method for controlling a storage/retrieval device in a flat storage facility which includes a rectangular storage item placement plane and a storage/retrieval device and in which the storage/retrieval device includes: a Y-direction laterally moving member that has a length corresponding to a width of the storage item placement plane in a lateral X direction and that is freely moved laterally in a forward/backward Y direction of the storage item placement plane; a carriage that is supported on the Y-direction laterally moving member so as to be freely moved in the lateral X direction; and a storage item gripping means that is supported on the carriage so as to be freely raised and lowered, and the storage/retrieval device is configured so as to be able to store and retrieve a storage item gripped by the storage item gripping means with respect to respective storage item placement points set on the storage item placement plane by the movement of the Y-direction laterally moving member in the forward/backward Y direction, the movement of the carriage in the lateral X direction, and the raising/lowering movement of the storage item gripping means, the method comprising:
 control being performed by determining downward flexural deformation distances of the Y-direction laterally moving member between end portions thereof in the lateral X direction;
 setting lowering distance adjustment values of the storage item gripping means for the storage item placement points based on the downward flexural deformation distances; and
 reducing lowering distances of the storage item gripping means by the lowering distance adjustment values.

2. The method for controlling a storage/retrieval device in a flat storage facility according to claim 1, wherein:
 a distance measuring means for measuring a vertical distance to the storage item placement plane is attached to the carriage,
 the carriage is moved to a measurement position between the end portions of the Y-direction laterally moving member in the lateral X direction,
 the vertical distance to the storage item placement plane is measured with the distance measuring means and
 the lowering distance adjustment value is set based on the measured value.

3. The method for controlling a storage/retrieval device in a flat storage facility according to claim 1, wherein:
 a distance measuring means for measuring a vertical distance to the storage item placement plane is supported on a lower end portion of the storage item gripping means,
 the carriage is moved to a measurement position between the end portions of the Y-direction laterally moving member in the lateral X direction,
 in a state where the storage item gripping means is lowered a given distance from the carriage, the vertical distance to the storage item placement plane is measured with the distance measuring means, and
 the lowering distance adjustment value is set based on the measured value.

4. The method for controlling a storage/retrieval device in a flat storage facility according to claim 3, wherein:
 the distance measuring means is attached to a support member gripped by the storage item gripping means so as to match a center position of a flat surface of the storage item gripped by the storage item gripping means or to be located in a vicinity thereof.

* * * * *